J. H. WAGENHORST.
DEMOUNTABLE RIM TOOL.
APPLICATION FILED JAN. 16, 1912.
1,160,220.
Patented Nov. 16, 1915.
2 SHEETS—SHEET 1.
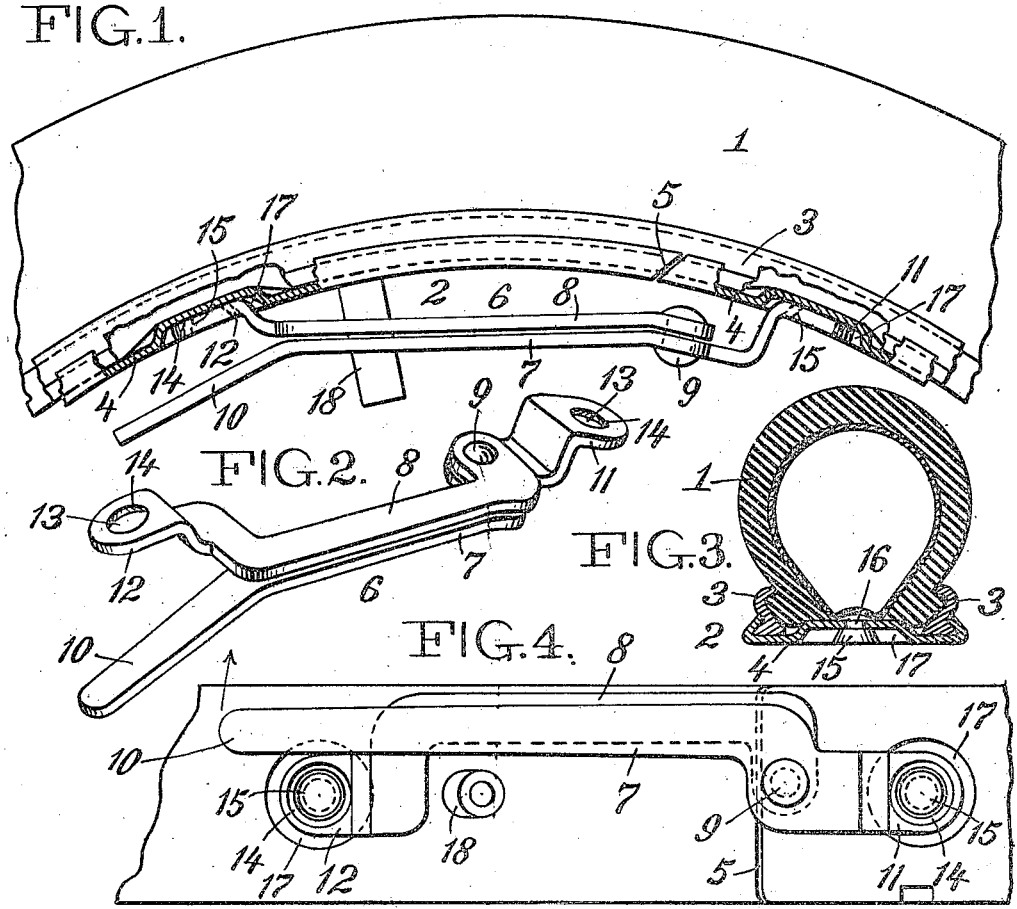
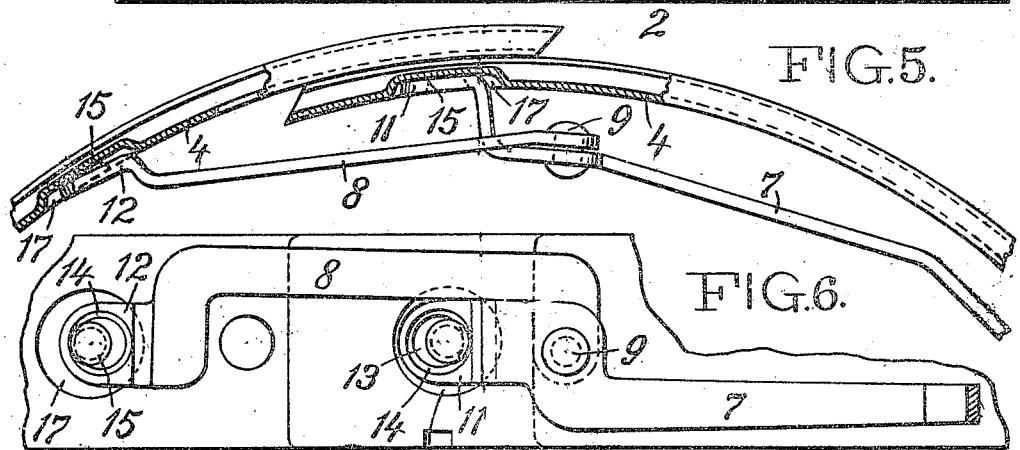
Witnesses:
Gerald E. Terwilliger
Edmund Quincy Moses
Inventor
James H. Wagenhorst
By his Attorney
Seward Davis

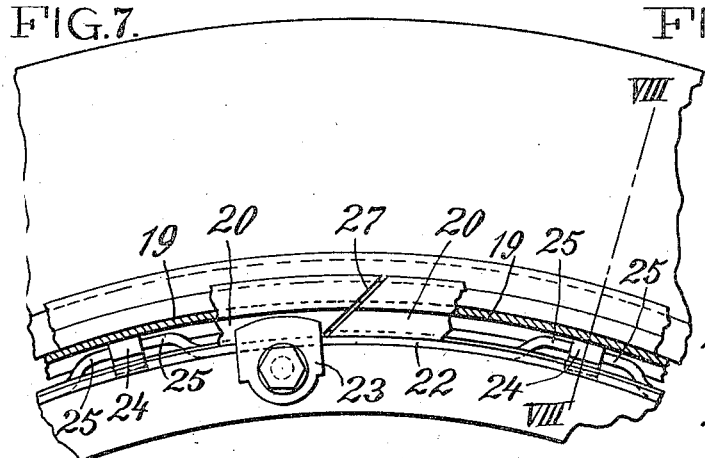
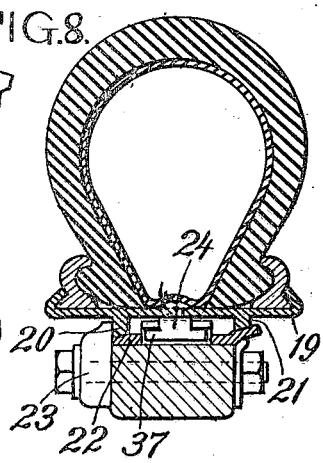
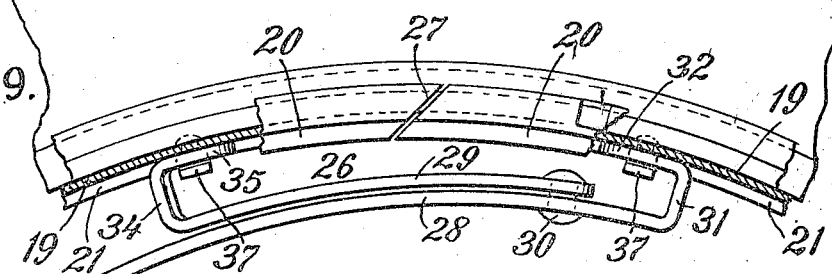
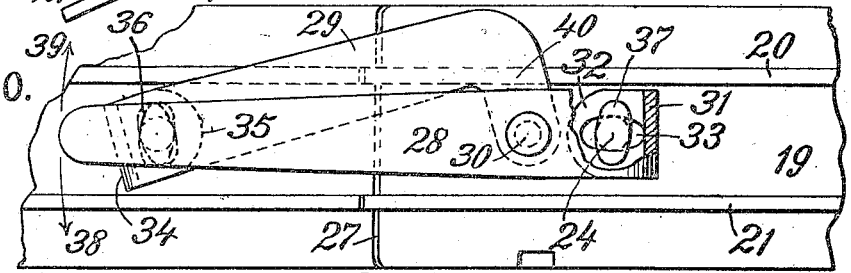
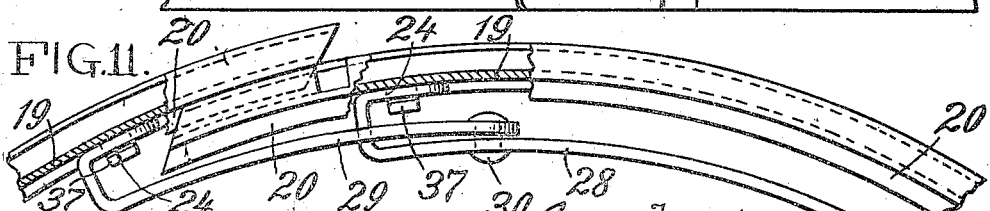

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

DEMOUNTABLE-RIM TOOL.

1,160,220.  Specification of Letters Patent.  Patented Nov. 16, 1915.

Application filed January 16, 1912. Serial No. 671,491.

*To all whom it may concern:*

Be it known that I, JAMES H. WAGENHORST, a citizen of the United States, residing in the city of Akron, county of Summit, and State of Ohio, have invented certain new and useful Improvements in Demountable-Rim Tools, of which the following is a specification.

In vehicle wheel rims for carrying pneumatic and other resilient tires, it is a common practice to mount the tire-carrying rim removably upon the vehicle wheel, rims of this class being known as demountable rims. The tire carrying portion of the rim has further been so constructed that it may be modified in some way so as to permit the easy application and removal of the resilient tire. One way of accomplishing this result has been the splitting of the rim transversely in order to permit it to be collapsed and thus withdrawn from inside of the tire. In rims of this character difficulty has always been experienced in collapsing the rim and holding it collapsed while the tire is applied or removed and in then expanding the rim again to its original diameter.

My present invention relates to a rim of this character provided with a tool by which it may be expanded and contracted, the rim and tool being provided with interlocking means by which the tool may be secured to the rim.

In the accompanying drawings which form a part of this specification, Figure 1 is a side elevation of a portion of a tire-carrying rim having a tire mounted thereon and showing my improved tool connected to the rim, portions of the rim being broken away to show the connections between the tool and rim; Fig. 2 is a perspective view of one form of my improved tool detached from the rim; Fig. 3 is a transverse section through the improved rim shown in Fig. 1 and the tire mounted thereon; Fig. 4 is a view of the underside of the rim and tool shown in Fig. 1; Fig. 5 is a view of the rim and tool shown in Fig. 1, the rim being collapsed and removed from the tire; Fig. 6 is a view similar to Fig. 4, the parts being shown in the position illustrated in Fig. 5; Fig. 7 is a side elevation of a modified form of rim carrying a tire and mounted upon a wheel felly; Fig. 8 is a transverse section on line VIII—VIII of Fig. 7; Fig. 9 is a side elevation of the rim and tire shown in Fig. 7 removed from the felly and with a modified form of my tool attached thereto, parts of the rim being broken away; Fig. 10 is a view of the underside of the rim and tool shown in Fig. 9, a part of the tool being broken away to show the means for attaching it to the rim; Fig. 11 is a view of the rim and tool shown in Fig. 9 with the rim collapsed and removed from the tire.

Referring to the drawings in detail, and particularly to Figs. 1 to 6, 1 is the resilient tire which is carried by the tire-carrying rim 2. The latter is adapted to be secured upon a vehicle wheel in any suitable manner, the means for securing the rim upon the wheel forming no part of the present invention. The form of rim which I have here illustrated comprises the tire-retaining flanges 3 and the rim base 4. The flanges 3 are endless, while the rim base is transversely split, preferably in a plane angularly disposed with relation to the surface of the rim base, as indicated at 5. The rim may, however, be of usual clencher cross-section, the flanges being integral with the rim base, both flanges and rim base being transversely split. In order to collapse the rim base so as to permit the endless flanges and the tire to be removed, I provide the tool 6, which consists of the lever member 7 pivoted to the link member 8 by means of the pivot 9. The end of the lever member 7 is extended to form a handle 10 by which the tool may be operated. The lever and link members are each provided with end portions 11 and 12, respectively, offset from the main planes of the members, these end portions being provided with means to engage correspondingly formed means upon the rim base at each side of the split in the latter. In the form of my invention illustrated in Figs. 1 to 6, the ends 11 and 12 each have formed therein a hole 13, the walls of which are undercut, as indicated at 14. Each end of the rim base is provided with a dovetail shaped lug 15 riveted, welded or otherwise suitably secured to the rim, preferably by being formed with a neck 16 passing through a hole in the rim base and riveted over. If it is desired to keep the lug from projecting within the rim, which might interfere with the securing of the rim upon the wheel, if the rim were intended to be secured upon the wheel in the manner set forth in my application Serial Number 668,771, filed December 30, 1911, for instance, this result may be accomplished by forming a depression 17 in the rim base, by offsetting the metal thereof. The lug 15 is then mounted in the bottom of this depression. The depression is made large enough to permit it to receive the end of the tool, the lug 15 being received in the hole 13 of the latter, which is large enough to pass over the portion of the lug of largest diameter, as indicated in Fig. 4. When pressure is put upon the tool the walls 14 of the holes 13 in the ends of the tool will be drawn into engagement with the undercut sides of the lugs 15, as indicated in Fig. 6, and the tool will thus be prevented from slipping off of the lugs. Both members of the tool are preferably offset laterally, as clearly indicated in Fig. 4, in order to clear the valve-stem 18, in case it is desired to locate the valve-stem near the split in the rim.

The operation of my tool will be apparent from what has been said. The tool having been applied to the rim, as shown in Fig. 4, the handle 10 of the lever member 7 is grasped and is swung laterally outward, pivoting about the lug 15, with which its end 11 is in engagement. This movement of the lever member obviously draws on the link member 8 through the pivot 9, the two lugs 15 being thus urged toward each other and the rim caused to collapse, as shown in Figs. 5 and 6. The cutting of the rim base on an inclined plane, so as to bevel the ends thereof, facilitates the telescoping of the latter. The lever member 7 is swung around until it is in the position shown in Fig. 6, when the pivot 9 passes beyond the line through the centers of the two lugs 15, that is, beyond the "dead-center." When the tool is in this position the expansive force of the rim automatically locks the tool, and the rim is thus held in contracted or collapsed condition. The collapsed rim with the tool mounted thereon may readily be removed from one tire and inserted into another, the peculiar formation of the lugs and the holes in the ends of the tool preventing the latter from becoming detached. To expand the rim it is simply necessary to swing the lever member 7 back to the position shown in Fig. 4, after which the tool may be readily removed.

In Figs. 7 to 11 I have shown a modified form of rim and the tool adapted to coöperate therewith. The rim shown in these figures is of the cross-section illustrated in my application Serial Number 639,953, filed July 22, 1911, the rim base being provided with inwardly extending flanges 20 and 21 which engage beveled surfaces at the edges of the felly band 22. The rim is held upon the felly band against lateral displacement by means of a suitable locking device, such as that indicated at 23. In order to prevent the tire-carrying rim from creeping when secured upon the felly band, I provide driving lugs 24 riveted, welded or otherwise suitably secured to the inside of the rim base between the flanges 20 and 21. These lugs 24 are engaged between tongues 25 punched up from the felly band. The driving lugs 24 I preferably utilize also for the purpose of engagement with the tool 26 illustrated in Figs. 9, 10 and 11, which is used to contract and expand the rim base. The rim base is transversely split at 27, preferably on a diagonal plane, as described in connection with the rim shown in Figs. 1 to 6. The tool 26 comprises a lever member 28 and a link member 29 pivoted together by means of the pivot 30. The end of the lever member 28 is bent into a hook 31, the end portion 32 of which is provided with a slot 33 shaped to receive one of the lugs 24. The end of the link member 29 is similarly hooked at 34, the inturned end 35 being slotted at 36 to receive the second lug 24. The lugs 24 are preferably formed with T heads 37 arranged with their longer axes transverse to the rim. The holes 33 and 36 are elongated so as to permit the T heads of the lugs to pass through them, the longer axis of the hole 33 lying preferably in the same direction as the axis of the lever member 28, while the longer axis of the hole 36 is preferably located nearly, but not quite, at right angles to the axis of the hole 33, when the parts of the tool are in the position shown in Figs. 9 and 10.

To apply the tool, the latter, while the link and lever members are held in the relative position shown in Fig. 10, is turned laterally until the axis of the lever member is at right angles to the rim, thus bringing the longer axis of the hole 33 in coincidence with the longer axis of the T head 37, when the T head will pass through the hole and the end of the lever member be thus engaged with the lug 24. The tool is then turned back into the position shown in Fig. 10. Then the lever member is swung away from the link member a short distance in the direction indicated by the arrow 38 in Fig. 10, sufficiently to swing the link member into such a position that the longer axis of the hole 36 will correspond with the longer axis of the T head of the second lug 24. The end of the link is then engaged with this lug 24 and the lever member 28 is swung back into the position shown in Fig. 10. The tool is then securely locked to the lugs 24 and is ready for operation. To operate the tool, the lever member 28 is swung in the direction indicated by the arrow 39 in Fig. 10 until the parts are in the position shown in Fig. 11, thus contracting the rim as indicated. The pivot 30 will pass the line of centers of the lugs 24, thus causing the tool to automatically lock the rim in contracted position. The link member 29 is offset, as indicated at 40, in order that the lever member may be swung half-way around without the hook portion thereof interfering with the link. By hooking or turning the ends of the link and lever members toward each other, a very compact tool is produced, as the telescoping end of the rim may be moved almost up to the lug 24, as indicated in Fig. 11, without interfering with any part of the tool. The rim is expanded by simply swinging the lever member 28 back to the position indicated in Fig. 10, after which the tool may be detached from the lugs 24 by reversing the operations described for attaching the tool.

Having thus described certain preferred embodiments of my invention, but without desiring to limit myself to the details thereof any further than as defined in the claims, what I claim and desire to secure by Letters Patent is:

1. A tool for collapsing transversely split vehicle wheel rims comprising a lever member having pivoted thereto between its ends a link member, the free ends of said link and lever members each having a hole therein, the walls of said holes being under-cut.

2. A tool for collapsing a transversely split vehicle wheel rim comprising a lever member having pivoted thereto between its ends a link member, an end portion of each of said members having a hole therethrough with undercut walls adapted to engage with tapered projections upon the rim, the axis of each hole being substantially parallel to the pivotal connection between said lever member and said link member, whereby the axes of the pivotal connection between rim and tool and the pivotal connection of said link and lever members lie substantially in the same plane when the tool is in position for application to the rim.

3. A tool for collapsing a transversely split vehicle wheel rim comprising a lever member having a shank, a handle projecting from one end thereof, a portion bent at an angle to said shank, the end of said laterally bent portion being again bent at an angle to said portion, said end having an eye formed therein, the walls of which are undercut, and a link member pivoted to said lever member at the point where the lever member is bent laterally, said link member consisting of a shank having a portion thereof bent laterally at the free end thereof, the end of said bent portion being again bent and having an eye therethrough, the walls of which are undercut.

4. A tool for collapsing a transversely split vehicle wheel rim comprising a lever member having pivoted thereto between its ends a link member, the end of the link member and the end of the lever member being offset from the plane of said members, said offset ends being adapted for pivotal connection with portions of the rim, said lever member being adapted to be swung beyond its dead center to engage one of said offset ends to automatically lock the tool in collapsed position.

5. A tool for collapsing a transversely split vehicle wheel rim comprising a lever member having pivoted thereto between its ends a link member, the end of the link member and the end of the lever member being adapted for pivotal connection with portions of the rim on opposite sides of the split therein and the end of the lever member crossing the plane of the shank of the link member, whereby the point of connection between the lever member and the link member may be swung past the pivotal connection of one of said ends with the rim until the lever member and link member engage to automatically lock the tool in collapsed position.

6. A tool for collapsing a transversely split vehicle wheel rim comprising a lever member having a shank and an end portion bent laterally from said shank, and a link member having a shank and an end portion bent laterally therefrom, the bent end of said lever member, and one end of said link member having a shank and an end portion pivotal connection with the rim, the opposite end of said link member being pivoted to said lever member near the bend therein.

JAMES H. WAGENHORST.

Witnesses:
SEWARD DAVIS,
EDMUND QUINCY MOSES.